United States Patent [19]

Wallqvist et al.

[11] Patent Number: 4,510,379
[45] Date of Patent: Apr. 9, 1985

[54] CONTROL DEVICE FOR RECORDING DISTANCE MEASURING INSTRUMENT ATTACHED TO A VEHICLE HUB

[75] Inventors: Sven Wallqvist; Rune Sund, both of Halmstad, Sweden

[73] Assignee: Haldex AB, Halmstad, Sweden

[21] Appl. No.: 549,467

[22] Filed: Nov. 7, 1983

[30] Foreign Application Priority Data

Nov. 11, 1982 [SE] Sweden .................. 8206418

[51] Int. Cl.³ .................................. G01C 22/00
[52] U.S. Cl. ........................... 235/95 C; 235/96; 235/95 R
[58] Field of Search ............... 235/95 R, 95 B, 95 C, 235/96, 97, 1 D, 103, 133 A; 346/33 D, 33 MC; 377/23; 74/13, 14

[56] References Cited

U.S. PATENT DOCUMENTS 3,200,403  8/1965  Bush .................. 235/95 R
4,083,489  4/1978  Borgstrom ............ 235/95 C Primary Examiner—Benjamin R. Fuller
Attorney, Agent, or Firm—Sherman & Shalloway

[57] ABSTRACT

A control device for an instrument (10) attached to a vehicle wheel hub for recording the distance covered by the vehicle comprises a counting mechanism with several number-carrying wheels (25), a stamping mechanism (29,30) for stamping cards, a means (14) for advancing the number-carrying wheels of the counting mechanism in response to the distance covered, and a pendulum, the oscillation axis of which coincides with the vehicle wheel axle, and which by substantially standing still effects a relative movement in relation to the recording instrument. This movement is utilized for driving the means for advancing the number-carrying wheels of the counting mechanism via a gear unit (12). The means for advancing the number-carrying wheels of the counting mechanism comprise a feed hook (14), which is deformed permanently when number-carrying wheels of the counting mechanism are blocked, and thereby effects permanent closing of a first electric contact (14b-34). A movable member (18) in the gear unit (12) is provided with at least one signal shoulder (49), which is capable upon movement transfer of the gear unit to alternatingly open and close a second electric contact (33-34). Furthermore, an element (34,35) of the electric contacts is provided for scanning the condition of the electric contacts in order to render possible rapid observation, whether the recording instrument operates in the way intended.

10 Claims, 7 Drawing Figures

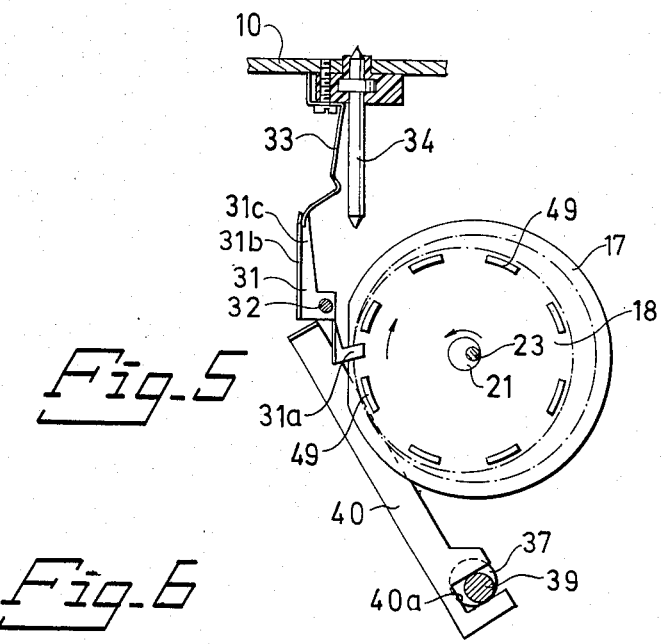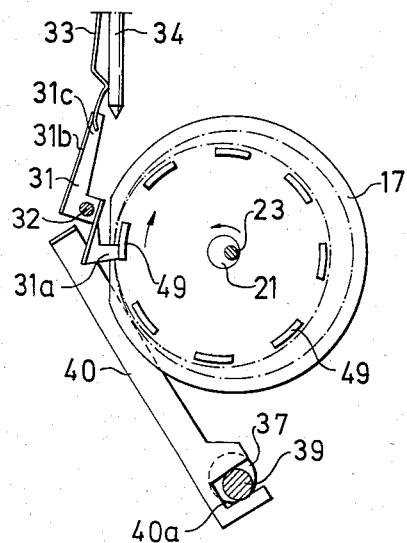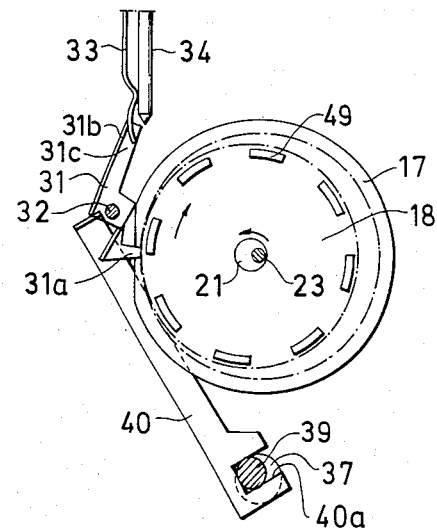

CONTROL DEVICE FOR RECORDING DISTANCE MEASURING INSTRUMENT ATTACHED TO A VEHICLE HUB

This invention relates to a device for controlling an instrument, which when attached to the hub of a vehicle records the distance covered by the vehicle. Such an instrument comprises a counting mechanism with several number-carrying wheels, a printing mechanism for stamp cards, means for advancing the number-carrying wheels of the counting mechanism in response to the distance covered, and a pendulum, the oscillation axis of which coincides with the vehicle wheel axis and which by substantially standing still effects a relative movement in relation to the recording unit. This relative movement is utilized for driving via a gear unit the means for advancing the number-carrying wheels of the counting mechanism.

A distance measuring instrument of the general kind referred to above is disclosed in U.S. Pat. No. 4,083,489. This known instrument is very reliable in operation and relatively difficult to manipulate in a manner so as to yield an incorrect recordal of the distance covered by the vehicle, without revealing that such a manipulation has taken place when the instrument is being read. It is desired, however, to render unauthorized interference with the hub-attached instrument still more difficult and, respectively, to render it possible to control more simply and safely the knowledge as to whether the distance measuring instrument was not subjected to interference attempts.

The main object of this invention, therefore, is to provide a control device for a distance measuring instrument of the aforesaid kind, which can be controlled in a rapid, simple and safe manner such that the said instrument operates as intended. This object is achieved in that the control device has been given the characterizing features defined in the attached claims. Due to the fact, that the means for advancing the number-carrying wheels of the counting mechanism includes a feed hook, which is deformed permanently when number-carrying wheels of the counting mechanism are blocked, and thereby effects the permanent closing of a first electric contact, the control of the operation of the counting mechanism has been reduced to an observation of whether an electric contact is open or closed, which observation is a very simple measure. None of the number-carrying wheels in the counting mechanism, thus, can be blocked without such blocking immediately being revealed at the control of the instrument. Since a movable member in the gear unit is provided with at least one signal shoulder, which is capable at the movement transfer of the gear unit to alternatingly open and close a second electric contact, it is possible by a simple control of the opening and closing function of the contact to determine if the gear unit operates in the way intended. Since the control device according to the invention permits a simple control of the operation of both the counting mechanism and the gear unit, a possible interference with the distance measuring instrument in order to manipulate the distance recorded by the instrument, will be revealed immediately. This will have a quite considerable preventive effect.

An embodiment of the invention in the form of a control device is described in greater detail in the following, description when taken with reference to the accompanying drawings, in which connection further advantages obtained by various characterizing detail features of the invention will also be stated.

FIG. 5 shows a contact arm member for gear unit operation control, and FIGS. 6 and 7 show the mode of operation of the contact arm member.

Figure 1:
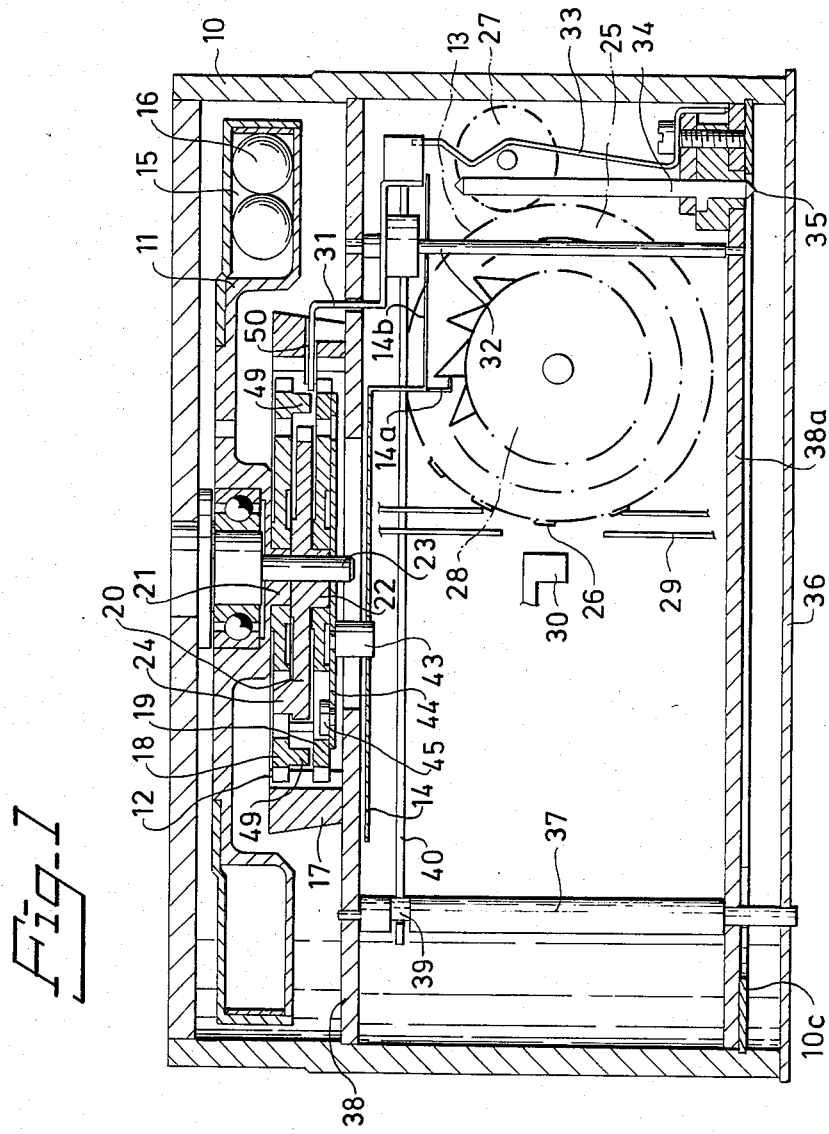
FIG. 1 is a cross-sectional view through the casing of the distance measuring instrument, showing the pendulum, gear, unit counting mechanism and drive means for the counting mechanism.

The distance measuring instrument shown in FIG. 1 comprises a casing 10 to be attached to a wheel of the vehicle. The casing encloses a pendulum 11, a gear unit 12, a counting mechanism 13 and drive means 14 for advancing the counting mechanism. The pendulum comprises a closed space 15 with movable balls 16 and is of the type described in the aforesaid publication. The gear unit consists of (1) internally toothed annular pinion 17 rigidly connected to the casing, (2) two planetary wheels 18,19 and (3) an eccentric disc 20 located between the planetary wheels. The first planetary wheel 18 is mounted on an eccentric 21, which is rigidly connected to the pendulum, and meshes with the teeth of the annular pinion. The second planetary wheel 19 also meshes with the annular pinion teeth and is mounted rotatably on a central pin 22 formed as an eccentric on the eccentric disc 20. The planetary wheels and the eccentric disc are mounted on a common shaft 23, which is attached on the bottom of the casing 10. A connecting pin 24 is provided on the eccentric disc 20 and projects into the first planetary wheel 18, so that the first planetary wheel drives the eccentric disc, which in its turn by its central pin 22 drives the second planetary wheel 19.

As the vehicle moves the pendulum 11 stands still relative to the casing 10, which rotates with the wheel, to which the distance measuring instrument is attached. The planetary wheels 18,19 are caused to rotate, in such a manner, that the second planetary wheel 19 rotates at a speed substantially reduced relative to the annular pinion 17 and thereby drives the counting mechanism via a drive wheel 44 and the drive means 14 as will be explained below.

The gear unit is of known type, and its mode of operation. therefore, is not described here in detail.

The counting mechanism 13 comprises a plurality of number-carrying wheels 25, which are provided with numbers 26 on projecting shoulders. Between the number-carrying wheels transfer wheels 27 are located for stepped advancement by rotation of a subsequent number-carrying wheel through one step when a preceding number-carrying wheel has been rotated through a full revolution. In the drawing only one number-carrying wheel and one transfer wheel are shown. The counting mechanism is provided with a toothed wheel 28, which is advanced in steps by the drive means 14 and is connected to the number-carrying wheel, which yields the least significant number at the reading of the instrument. In connection to the number-carrying wheels, a guide bar 29 for a reading card and a hammer, which is indicated schematically by the reference numeral 30, is provided so that a printed record of the position of the counting mechanism can be obtained. The counting mechanism with the reading means also is of known type and does not constitute a part of the invention.

The control device according to the invention comprises the drive means 14 for stepped advancement of the counting mechanism and a contact arm member 31, which is mounted pivotally on a shaft 32 and actuates a contact spring 33.

The drive means and contact arm member are arranged so as to co-operate with an electric contact pin 34, the point 35 of which is a connecting contact for a control apparatus. The drive means 14 consist of a feed hook, which is shown more clearly in FIG. 2 to be provided with a grip portion 14a and a contact finger 14b.

The casing 10 is provided with a cover 36, which is secured on an axle 37 pivotally mounted in partition walls 38 and 38a, which are rigidly attached in the casing. The cover can be turned so that the guide bar 29 for a reading card or stamp is exposed, whereby the axle 37 is rotated and thereby via an eccentric portion 39 on the axle turns a disengaging arm 40 for the contact arm member 31, as will be explained in detail with reference to FIGS. 5-7. The casing 10 is attached non-rotatably on a holder on a vehicle wheel. Outside the wall 38a a sealing clamping ring 10c is located which retains the mechanism in the casing 10.

Figure 2:
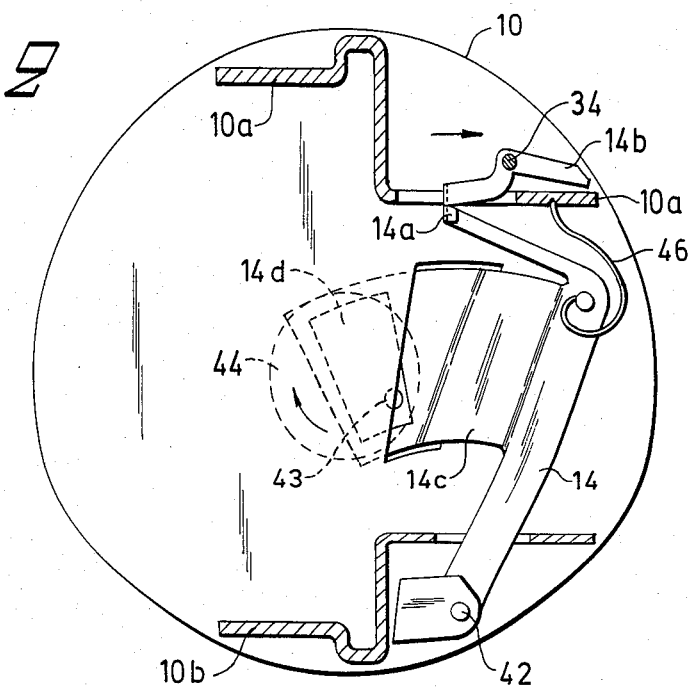
FIG. 2 shows a feed hook for advancing the counting mechanism.

The feed hook shown in FIG. 2 is an oblong arm 14, which is mounted pivotally about an axle 42 attached in the casing 10. The arm 14 is provided with a projecting guide portion 14c, which has a substantially sector-shaped opening 14d. This opening is intended to receive a guide pin 43, which is attached on the drive disc 44 located adjacent the second planetary wheel 19 and driven by the same by means of a pin 45 projecting into the planetary wheel as shown in FIG. 1. The arm 14 is further connected to one end of a spring-catch 46, the other end of which is mounted in a depression in a member 10a. The members 10a and 10b are two attachment profiles provided in the casing for components and details.

As the vehicle moves, the second planetary wheel 19 causes the drive wheel 44 to rotate, whereby the guide pin 43 moves continuously on an arc-shaped path. The arm 14 of the feed hook is hereby caused to perform a reciprocating movement, whereby the advancement in the direction of the arrow is used for rotating the toothed wheel 28 through one step. The arm 14 in FIG. 2 is shown in the position, which it assumes when it has advanced the toothed wheel one step and shall be returned for advancing the toothed wheel a further step. Upon rotation of the guide pin 43 clockwise in the direction of the arrow, the arm 14 is rotated counter-clockwise inwardly, whereby the spring catch 46 is tightened and thereby passes the catch point, so that the arm remains in its inner position when the guide pin 43 again starts to move to the outer position of the arm 14. During the inward movement of the arm 14, the guide pin, thus, abuts the edge of the opening 14d which is the remote edge relative to the arm. When the guide pin 43 has moved through a distance in the direction to the outer position of the arm 14, it contacts the edge of the opening 14d which is the forward edge relative to the arm 14 and thereby starts moving the arm 14 toward the outer position thereof. When the catch point of the spring 46 is being passed, the spring switches to the position shown in FIG. 2 and thereby pushes the arm 14 by a distinct stroke to the outer position, whereby the arm 14 by means of its grip portion 14a rotates the toothed wheel 28 through one step. This procedure is repeated continuously as long as the vehicle is running.

Figure 3:
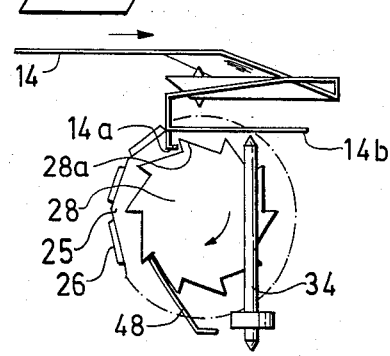
FIG. 3 shows the advancing of the counting mechanism.

The stepped feed of the toothed wheel 25 is illustrated in FIG. 3. The grip portion of the feed hook 14 there is prepared to mesh with a tooth 28a on the toothed wheel 28. When the feed hook moves in the direction of the arrow, the grip portion of the feed hook moves the tooth 28a so that the toothed wheel rotates through one step, and a new number 26 is advanced to recording position. The feed hook is thereafter returned to the position shown in the Figure, so that a new operation of stepped advancement can be carried out. This is the normal mode of operation of the feed hook, and the contact finger 14b of the feed hook thereby contacts the contact pin 34. The toothed wheel is provided with a catch 48 which prevents return movement.

Figure 4:
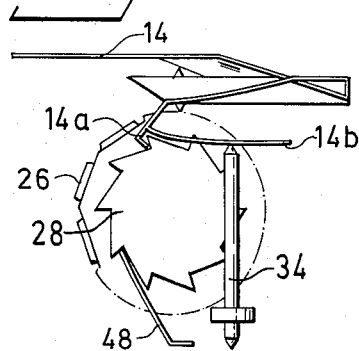
FIG. 4 shows the consequence of blocking of a number-carrying wheel in the counting mechanism on the advancement of the counting mechanism.

When the toothed wheel 28 or one of the number-carrying wheels 25 has been blocked in order to prevent the counting mechanism from recording the distance covered by the vehicle, the grip portion 14a of the feed hook cannot rotate the toothed wheel through the step required. The grip portion is so dimensioned that it is deformed in such a case and thereafter does not reassume its original shape. The deformation, thus, is permanent. It implies that the contact finger 14b of the feed hook is bent (downward in FIG. 3) and thereby contacts the contact pin 34, so that an electric contact is closed. This is illustrated in FIG. 4. The closing of the contact is easily observed at an inspection or sudden check by means of the accessible point 35 of the contact pin 34, because said closing of contact is permanent.

In order to render it possible to also control the mode of operation of the gear unit, the contact arm member 31 is provided. As already mentioned, the arm member is mounted pivotally on the axle 32 and controlled by shoulders 49 on the first planetary wheel 18. The guide end of the contact arm member is formed as a blade and projects inwardly through a gap 50 in the annular pinion 17. The other end of the contact arm member actuates the contact spring 33, which at pivotal movement of the contact arm member is caused to abut the contact pin 34. The mode of operation of the contact arm member appears more clearly from FIGS. 5-7.

In FIG. 5 the contact arm member 31 and the first planetary wheel 18 provided with shoulders 49 are shown schematically, seen in a horizontal view from below in FIG. 1. The contact arm member is provided at one end with a blade-shaped nose 31a, which as mentioned above projects inwardly through the narrow gap 50 in the annular pinion 17. The nose projects into the path of movement for the shoulders and is, therefore, actuated by the same, so that the contact arm member is pivoted about the mounting axle 32. The other end of the contact arm member is formed with a tail portion 31c, which actuates one end of the contact spring 33, which upon pivotal movement of the contact arm member is caused to abut the contact pin 34, as illustrated in FIG. 6. The other end of the contact spring 33 is connected to the casing 10. As the planetary wheel 18 is mounted on an eccentric rotating in the centre of the annular pinion, the contact point of the planetary wheel with the annular pinion migrates about the annular pinion, whereby the planetary wheel rotates in a direction opposed to the eccentric, as indicated by the arrows. When the contact point of the planetary wheel with the annular pinion is located substantially diametrically in relation to the nose of the contact arm member, the shoulders 49 move past the nose 31a on a path spaced from the nose. In this case the shoulders, thus, do not actuate the nose and, of course, the contact arm member is not caused to rotate. By rotating the vehicle wheel provided with the distance measuring instrument through some revolutions, thus, a contact closing procedure is obtained which yields a certain signal pattern. This signal pattern is easily recorded by means well known to those skilled in the art such as a micro-computer with a memory means integral therewith, which may be electrically connected to the contact pin 34. The signal pattern depends on the number of shoulders on the planetary wheel 18 and on the gear ratio between the annular pinion 17 and the planetary wheel, i.e. on the number of teeth on the annular pinion and planetary wheel. By reading the signal pattern recorded by the above described means, thus, it is easily observed whether the gear unit operates as intended.

In FIGS. 5-7 the disengaging arm 40 indicated only schematically in FIG. 1 is shown in greater detail. This disengaging arm is moved in its longitudinal direction by the eccentric 37,39, which engages with a recess 40a in the disengaging arm. The disengaging arm is moved to abut a projecting edge 31b on the contact arm member when the cover 36 on the casing is turned to closed position. Thereby the nose 31a of the contact arm member is moved away from the paths of movement of the shoulders 49, and the contact spring 33 is caused to abut the contact pin 34. This is illustrated in FIG. 7 and implies several advantages. Firstly, the contact and the contact arm member need not operate during normal run of the vehicle. Secondly, the pendulum is not loaded with the work required for the pivotal movement of the contact arm member, but the work of the pendulum can be utilized entirely for driving the counting mechanism. Thirdly, the electric contact is maintained closed during the running of the vehicle, thereby protecting the contact surfaces against oxidation and soiling, so that the contact surfaces are unworn and clean when control is to be carried out.

Although only one embodiment of the control device according to the invention has been described and shown, it is obvious that many variations and modifications can be imagined within the scope of the invention idea. The grip and contact portions of the feed hook, for example, can be designed in a different way, and the contact arm member can be guided by signal shoulders, which are located on another movable member in the gear unit. The closing of contact can take place at two different contact pins and, possibly, is indicated by light diodes.

What is claimed is:

1. A control device for an instrument (10) attached to a vehicle wheel for recording the distance covered by a vehicle, which instrument comprises a counting mechanism with several number-carrying wheels (25), a stamping mechanism (29,30) for stamping cards, a means for advancing number-carrying wheels of the counting mechanism in response to the distance covered, and a pendulum (11) having an oscillation axis which coincides with the vehicle wheel axle, and which by substantially standing still effects a relative movement in relation to the instrument, which movement is utilized for driving via a gear unit (12) the means for advancing the number-carrying wheels of the counting mechanism, characterized in that the means for advancing the number-carrying wheels (25) of the counting mechanism comprise a feed hook (14), which is deformed permanently when the number-carrying wheels of the counting mechanism are blocked, and thereby effects permanent closing of a first electric contact (14b-35), and that a movable member (18) in the gear unit (12) is provided with at least one signal shoulder (49), which is capable at a certain movement transfer of the gear unit to alternatingly open and close a second electric contact (33-34), and that an element (34,35) of said first and second electric contact is provided for scanning the condition of the first electric contact when said vehicle wheel is stationary or moving and the second electric contact when said vehicle wheel is moving.

2. A device as defined in claim 1, in which the number-carrying wheels (25) of the counting mechanism are driven via a toothed wheel (28), characterized in that the feed hook (14) comprises a grip portion (14a), which hookingly engages with a tooth (28a) on the toothed wheel and is deformed at the feed movement of the feed hook (14) when the number-carrying wheels are blocked, and a contact portion (14b), which is connected to the grip portion (14a), so that upon deformation of the grip portion the contact portion is moved to abut a contact pin (34) whereby the contact portion (14b) and contact pin (34) form the first electric contact.

3. A device as defined in claim 2, characterized in that the feed hook (14) consists of an arm, which includes a bent portion (14a) forming the grip portion of the feed hook, and that the bent portion is provided with a projecting finger (14b) forming the contact portion of the feed hook, so that the contact portion is rotated when the grip portion is deformed.

4. A device as defined in claim 1, in which the gear unit (12) comprises an annular pinion (17), which is provided with internal teeth, a first planetary wheel (18), which is mounted on an eccentric (21) rigidly connected to the pendulum and capable to mesh with the annular pinion, and a secondary planetary wheel (19), which also is capable of meshing with the annular pinion (17) and is mounted rotatably on a central pin (22) formed as an eccentric on an eccentric disc (20) located between the two planetary wheels (18, 19) in such a manner, that the planetary wheels (18, 19) and the eccentric disc (20) are mounted about a common axle (23), and a connecting pin (24) is located between the first planetary wheel (18) and the eccentric disc (20), so that as the vehicle moves, the first planetary wheel drives the eccentric disc (20), which in its turn drives the second planetary wheel (19), at a reduced speed relative to said annular pinion said second planetary wheel driving the means for advancing of the counting mechanism, characterized in that the first planetary wheel (18) along its periphery is provided with a plurality of signal shoulders (49), which are capable of cooperating with a movable contact arm member (31) in such a manner, that the contact arm member upon abutting one of said signal shoulders (49) is moved by said shoulder to a position, in which the contact arm member (31) actuates a contact spring (33), which is caused to abut a contact pin (34) whereby the contact spring (33) of the contact arm member and the contact pin (34) form the second electric contact.

5. A device as defined in claim 4, characterized in that the contact arm member (31) is mounted pivotally and comprises a nose (31a), which is capable to of abutting the signal shoulders (49) on the planetary wheel (18), and a tail portion (31c), which is capable of actuating contact spring (33) to abut the contact pin (34) when the contact arm member (31) is pivoted by a signal shoulder (49).

6. A device as defined in claim 5, characterized in that the nose (31a) of the contact arm member projects through a slit (50) in the annular pinion (17).

7. A device as defined in claim 5 characterized in that the contact arm member (31) is provided with an outwardly bent portion (31b), which is located between the nose (31a) and tail portion (31c), which is capable of abutting a movable disengaging arm (40), which as the vehicle moves maintains the most (31a) of the contact arm member spaced from the path of movement of the signal shoulders (49).

8. A device as defined in claim 7, characterized in that the disengaging arm (40) is capable of maintaining the contact arm member (31) in such a position that the contact spring (33) guided by the contact arm member (31) abuts the contact pin (34).

9. A device as defined in claim 7, characterized in that the disengaging arm (40) is mounted movably and guided by an eccentric (39) located on a rotatable axle (37).

10. A device as defined in claim 9, characterized in that it is provided with a cover plate (36), which is attached on the rotatable axle (37), which is provided with an eccentric (39) for moving the disengaging arm (40), so that the cover plate (36) can be rotated between two positions, whereby in one position (control and reading position) the details of the control device are located protected below the cover plate, and the disengaging arm (40) maintains the nose (31a) of the contact arm member spaced from the path of movement of the signal shoulders (49), and in the second position the contact scanning element (34,35) and stamping mechanism (29,30) are exposed, and the disengaging arm (40) is released from the contact arm member (31).

* * * * *